(No Model.)

H. McHUGH & T. L. MANCHESTER.
MACHINE FOR MOLDING PLASTIC MATERIALS.

No. 318,010.  Patented May 19, 1885.

Witnesses
A. C. Fuller
Fred. A. Mason

Inventors
Hugh Mc Hugh
Thomas L. Manchester
by A. M. Mason
atty.

UNITED STATES PATENT OFFICE.

HUGH McHUGH AND THOMAS L. MANCHESTER, OF NEW BEDFORD, MASS.

MACHINE FOR MOLDING PLASTIC MATERIALS.

SPECIFICATION forming part of Letters Patent No. 318,010, dated May 19, 1885.

Application filed December 15, 1884. (No model.)

*To all whom it may concern:*

Be it known that we, HUGH McHUGH and THOMAS L. MANCHESTER, citizens of the United States, residing at New Bedford, in the county of Bristol and State of Massachusetts, have invented a new and useful Improvement in Machines for Molding Plastic Materials, of which the following is a specification.

This invention relates to machines for molding plastic material into ornamental strips, which strips are then applied to a surface—such as the fronts of picture-frames, cornices, and the like—as a decoration. In manufacturing these strips of plastic material it is desirable and necessary that their edges should be parallel with each other with clear cut and sharply-defined edges, in order to present a sightly appearance. It is also necessary that the thickness of said ornametal strip should be in proportion to the height of the raised ornaments thereon in order that the strip may be handled without stretching it out of shape. The plastic material used is of the consistence of very stiff dough, and in machines which have heretofore been used for forming ornamental strips of it, the force necessarily used in order to make the molded strip cleave from the ornamenting-roll has drawn the strip out of shape, and thus defeated the purpose of the machine, and this has been the case because the cutters with which the sides of the strip are trimmed have been placed on the figured or ornamental roll, thus making three sides from which the molded strip must cleave when coming from the machine, and making it impossible to draw the molded strip from the ornamenting-roll without getting it out of shape and ruining it for the purpose intended.

The object of this invention is to overcome the above-mentioned difficulties, and we attain this object by the mechanism illustrated in the accompanying drawings, in which—

Figure 1:
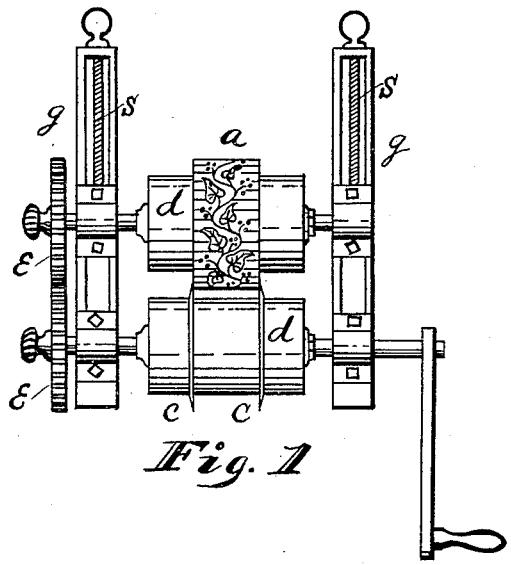
Figure 2:
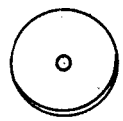

Figure 1 is a front view of our machine for molding plastic material into ornamental strips, and Fig. 2 represents a section of one of the rolls *d*.

*d d* are rolls composed of sections like Fig. 2, and are journaled in the uprights *g g*. The boxes of the upper roll are made to slide in the uprights, so that the distance of the upper from the lower roll may be regulated by means of the screws *s s*. One end of the roll-shafts are furnished with the gears *e e*, meshing together, that the rolls may have opposite motions in order that the plastic material may be drawn between them with facility. The upper roll is furnished with the engraved hub *a*, which hub is larger in diameter than the sections which compose the remainder of the roll. Between the sections of the lower roll, at suitable distances, are interposed the circular knives *c c*, so that the knives shall bear lightly on each side of the engraved hub *a*. The knives *c c* serve a double purpose—viz., forming the edges of the ornamental strip by cutting their edges parallel with each other, and loosening the strip from the engraved hub *a*, so that it is delivered from the rolls in a straight line without effort of the operator, and is therefore in perfect shape.

The shaft of one of the rolls is furnished with a crank or other suitable means of giving it motion.

The rolls *d d* are made in sections in order that other engraved hubs of various designs may be substituted for the one shown, and that the knives *c c* may be adjusted to the width of the hub.

The operation of the machine is as follows: The plastic material, which is of the consistence of very stiff dough, is rolled into the form of a rope of suitable size, according to the width and thickness of the ornamental strip which it is desired to form, and is thus passed between the rolls *d d*—*i. e.*, between the engraved hub *a* and that part of the lower roll which is between the knives *c c*. The pressure of the rolls stamps one side of the plastic material with the design on the engraved hub *a*, and the knives *c c* form and cut the edges of the same parallel with each other. The knives *c c* having an opposite motion from the engraved hub *a* serve to loosen the ornamental strip from it, and the strip is thus delivered straight from the machine in perfect shape.

The thickness of the ornamental strip, which must be in proportion to the height of its raised ornaments in order that it may be handled practically and successfully, is regulated by means of the screws *s s*.

Having thus described our invention, what we claim, and desire to secure by Letters Patent, is—

In a machine for molding plastic material, the combination of the rolls *d d*, composed of sections, one of said rolls being furnished with an engraved hub and the other with the knives *c c*, when arranged and operating as and for the purpose shown and described.

HUGH McHUGH.
THOMAS L. MANCHESTER.

Witnesses:
FRED A. MASON,
A. C. FULLER.